United States Patent [19]

Nachtigal

[11] 3,887,701

[45] June 3, 1975

[54] ANTIBACTERIAL ORAL COMPOSITIONS CONTAINING PRESERVATIVE-ANTIOXIDANTS

[75] Inventor: Julius Harvey Nachtigal, Colonia, N.J.

[73] Assignee: Colgate-Palmolive Company, New York, N.Y.

[22] Filed: Nov. 1, 1974

[21] Appl. No.: 411,726

[52] U.S. Cl. ................. 424/54; 424/52; 424/55
[51] Int. Cl. ............................................ A61k 7/16
[58] Field of Search .......................... 424/49–58

[56] References Cited
UNITED STATES PATENTS

| 3,574,823 | 4/1971 | Roberts et al. ............... 424/49 |
| 3,804,946 | 4/1974 | Harrison et al. ............. 424/52 |

FOREIGN PATENTS OR APPLICATIONS

| 2,158,102 | 5/1972 | Germany ........................ 424/54 |
| 825,577 | 12/1959 | United Kingdom ........... 424/54 |
| 1,197,164 | 7/1970 | United Kingdom ........... 424/50 |

OTHER PUBLICATIONS

*Chemical Abstracts,* Vol. 66, entry 45118y, *1967.*

Primary Examiner—Richard L. Huff
Attorney, Agent, or Firm—Robert L. Stone; Murray M. Grill; Herbert S. Sylvester

[57] ABSTRACT

Oral products containing bis-biguanido hexanes are disclosed which are effective in preventing the accumulation of bacterial plaque and do not stain teeth. Incorporation of certain reducing agents has been found to prevent dental staining while maintaining the activity of bis-biguanido hexanes in oral products. Effective reducing agents include, hydrogenated coumarin, and tri-hydroxylated benzoic acid and its lower alkyl ($C_1$–$C_4$) esters.

24 Claims, No Drawings

ANTIBACTERIAL ORAL COMPOSITIONS CONTAINING PRESERVATIVE-ANTIOXIDANTS

BACKGROUND OF THE INVENTION

This invention relates to oral compositions and, more particularly, to oral compositions containing bis-biguanido hexanes which do not stain teeth.

Bis-biguanido hexanes, and particularly 1,6-di-(p-chlorophenyl biguanido)hexane (chlorohexidine) and 1,6-bis-(2-ethylhexyl biguanido)hexane are known to possess highly desirable effects in inhibiting the growth of many microorganisms such as *Lactobacillus acidophilus odontolyticus*. Additionally, the bis-biguanido hexanes have been found to be effective in preventing the formation of dental plaque, calculus, gingivitis, and mouth odor.

However, clinical studies have indicated that these antibacterial agents concurrently stain teeth at levels established as effective for plaque reduction. Furthermore, incorporation of conventional oral product preservative systems has presented formulation problems due to chemical interactions with the bis-biguanido hexanes and their salts. Sodium benzoate, a commonly used preservative, has been found to be highly incompatible with bis-biguanido hexanes with regard to therapeutic activity as well as cosmetic stability.

SUMMARY OF THE INVENTION

Certain reducing agents have been discovered that do not react adversely with the bis-biguanido hexane compounds. Furthermore, the systems disclosed concurrently function in the role of antioxidants by virtue of their ability to inhibit dental stain formation by the bis-biguanido hexane compounds.

A number of reducing agents have been found to be effective in oral compositions containing bis-biguanido hexanes, including dihydrocoumarin, and tri-hydroxylated benzoic acid and its esters. These reducing agents are present in compounds of the present invention in amounts of about 0.001% to 10% by weight, and preferably from about 0.01% to 5% by weight.

Dihydrocoumarin, otherwise known as benzodihydropyrone, and more commonly referred to as melilotin, has been shown to be compatible with chlorhexidine to the extent that 70% chemical activity is assured through 9 weeks accelerated aging at 120°F. Additionally, melilotin has demonstrated in vitro effectiveness in inhibiting chlorhexidine-tea stain formation and HOCl oxidation of chlorhexidine.

Tri-hydroxylated (i.e., phenolic) benzoic acid and its lower alkyl ($C_1$ to $C_4$ carbon atoms) esters are also effective in stabilizing bis-biguanido hexanes in oral preparations while inhibiting dental stain formation. Among the most effective of these tri-hydroxylated benzoic acid esters are 3,4,5-trihydroxybenzoic acid (more commonly known as gallic acid) and its propyl ester, propyl gallate.

Any nontoxic, antibacterial, water-soluble salt of the bis-biguanido hexanes may be employed in the practice of the instant invention. For the purposes herein water soluble means sufficiently soluble to provide at least 0.0015% by weight of free agent to the solution. Examples thereof include water-soluble salts of 1,6-di-(p-chlorophenyl biguanido)hexane and 1,6-bis(2-ethylhexyl biguanido)hexane. The preferred acid addition salts are the gluconate, acetate, fluoride, dihydrogen fluoride, dihydrogen chloride, and the like. The salts of 1,6-bis(2-ethylhexyl biguanido)hexane are more soluble in lower alcohols such as ethanol than in water, and are generally employed in alcohol solution.

The antibacterial agent is employed in amounts such that the oral product contains between about 0.0015% and 15% by weight of the agent. Typically, the finished oral product contains about 0.001% to about 5.0% by weight, preferably about 0.01% to 5% by weight, and most preferably about 0.05% to 1.0% by weight of the agent. These amounts refer to the quantity of the free base form of the agent.

In certain forms of the invention the oral preparation may be substantially liquid in character, such as a mouthwash or rinse. In such a preparation the vehicle is typically a water-alcohol mixture. Generally, the ratio of water to alcohol is in the range of about 1:1 to 20:1, preferably 3:1 to 20:1 and most preferably about 17:3, by weight. The total amount of water-alcohol mixture in this type of preparation is typically in the range of from about 70% to about 99.9% by weight of the preparation. The pH of such liquid preparations is generally in the range of from about 4.5 to about 9, typically from 5.5 to 8.

Such liquid oral preparations may also contain a compatible surface active agent and/or a fluorine-providing compound.

In certain other forms of this invention, the oral preparation may be substantially solid or pasty in character such as a toothpowder, or a toothpaste or dental cream. The dental vehicle of such solid or pasty oral preparations contains polishing material. Examples of polishing materials are water-insoluble sodium metaphosphate, potassium metaphosphate, tricalcium phosphate, dihydrated calcium phosphate, anhydrous dicalcium phosphate, calcium pyrophosphate, magnesium orthophosphate, trimagnesium phosphate, calcium carbonate, alumina, aluminum silicate, zirconium silicate, silica, bentonite, and mixtures thereof. Preferred polishing materials include crystalline silica having particles sizes of up to 5 microns, a mean particle size of up to 1.1 microns, and a surface area of up to 50,000 $cm^2/gm$, insoluble sodium metaphosphate, anhydrous dicalcium phosphate, and calcium carbonate, which typically are finely divided and have an average particle size below 10 microns.

Alumina, particularly the hydrated alumina sold by Alcoa as C333, which has an alumina content of 64.9% by weight, a silica content of 0.008%, a ferric oxide content of 0.003%, and a moisture content of 0.37% at 110°C and which has a specific gravity of 2.42 and a particle size such that 100% of the particles are less than 50 microns and 84% of the particles are less than 20 microns, is particularly desirable.

When visually clear gels are employed, a polishing agent of colloidal silica, such as those sold under the trademark SYLOID as Syloid 72 and Syloid 74 or under the trademark SANTOCEL as Santocel 100 and alkali metal aluminosilicate complexes are particularly useful, since they have refractive indices close to the refractive indices of gelling agent-liquid (including water and/or humectant) systems commonly used in dentifrices.

Many of the so-called "water-insoluble" polishing materials are anionic in character and also include small amounts of soluble material. Thus, insoluble sodium metaphosphate may be formed in any suitable manner, as illustrated by Thorpe's *Dictionary of Applied*

*Chemistry*, Volume 9, 4th Ed., pp. 510–511. The forms of insoluble sodium metaphosphate known as Madrell's salt and Kurrol's salt are further examples of suitable materials. These metaphosphate salts exhibit a minute solubility in water, and therefore are commonly referred to as insoluble metaphosphates. There is present therein a minor amount of soluble phosphate material as impurities, usually a few percent such as up to 4% by weight. The amount of soluble phosphate material, which is believed to include a soluble sodium trimetaphosphate in the case of insoluble sodium metaphosphate, may be reduced by washing with water if desired. The insoluble alkali metal metaphosphate is typically employed in powder form of a particle size such that no more than 1% of the material is larger than 37 microns.

The polishing material is generally present in amounts ranging from about 20% to about 99% by weight of the oral preparation. Preferably, it is present in amounts ranging from about 20% to about 75% in toothpaste and from about 70% to about 99% in toothpowder.

In the preparation of toothpowders, it is usually sufficient to admix mechanically, e.g., by milling, the various solid ingredients in appropriate quantities and particle sizes.

In pasty oral preparations the combination of the bisbiguanido hexane antibacterial agent and reducing agent is compatible with the other components of the preparation. Thus, in a toothpaste, the liquid vehicle may comprise water, typically in an amount ranging from about 10% to about 90% by weight of the preparation. Glycerine, sorbitol, or propylene glycol may also be present as humectants or binders. Particularly advantageous liquid ingredients comprise mixtures of water, glycerine, and sorbitol.

In clear gels where the refractive index is an important consideration, about 10–30% by weight of water, 0 to about 80% by weight of glycerine, and about 20–80% by weight of sorbitol is preferably employed. A gelling agent, such as natural or synthetic gums or gum-like materials, typically Irish moss, sodium carboxymethylcellulose, methyl cellulose, or hydroxyethyl cellulose, may be employed. Other gelling agents which may be employed include synthetic inorganic silicated clay sold under the trademark LAPONITE as Laponite CP and Laponite SP, having the formula $[Si_8Mg_{5.1}Li_{0.6}H_{7.6}O_{24}]^{0.6-} Na^+_{0.6}$, gum tragacanth, polyvinylpyrrolidone, and starch. They are usually present in toothpaste in an amount up to 10% by weight, preferably in the range of from about 0.5% to about 5%. The preferred gelling agents are methyl cellulose, hydroxyethyl cellulose, Laponite CP, and most preferably Laponite SP. In a toothpaste or gel, the liquids and solids are proportioned to form a creamy or gelled mass which is extrudable from a pressurized container or from a collapsible, e.g., aluminum or lead tube.

Other suitable nonionic detergents are the condensation products of an α-olefin oxide containing 10 to 20 carbon atoms, a polyhydric alcohol containing 2 to 10 carbons and 2 to 6 hydroxyl groups and either ethylene oxide or a heteric mixture of ethylene oxide and propylene oxide. The resultant detergents are heteric polymers having a molecular weight in the range of 400 to about 1600 and containing 40% to 80% by weight of ethylene oxide, with an α-olefin oxide to polyhydric alcohol mole ratio in the range of about 1:1 to 1:3. These detergents are manufactured using well-known polymerization techniques under conditions of high temperature and high pressure. The olefin oxide and polyhydric alcohol usually are added to the reactor prior to the addition of ethylene oxide. These nonionic detergents may be mixed with similar nonionic detergents as well as other type nonionic detergents described herein.

The solid or pasty oral preparation may also contain a surface active agent and/or a fluorine-providing compound.

Surface active agents which may be employed are organic materials and afford increased prophylactic action, and assist in achieving thorough and complete dispersion of the preparation throughout the oral cavity. It is preferred to employ as the suface active agent a compatible detersive material which imparts to the preparation both detersive and foaming properties. The organic surface active material may be anionic, nonionic, ampholytic, or cationic in nature. Suitable such detergents are water-soluble salts of higher fatty acid monoglyceride monosulfates, such as the sodium salt of the monosulfated monoglyceride of hydrogenated coconut oil fatty acids; compatible higher alkyl sulfates, such as sodium lauryl sulfate; alkyl aryl sulfonates, such as sodium dodecyl benzene sulfonate; higher alkyl sulfoacetates; higher fatty acid esters of 1,2-di-hydroxy propane sulfonates; and substantially saturated higher aliphatic acyl amides of lower aliphatic amino carboxylic acids such as those having 12 to 16 carbons in the fatty acid, alkyl, or acyl radicals.

Nonionic surface active agents include condensates of sorbitan monostearate with from 20 to 60 moles of ethylene oxide (e.g., "Tweens"), condensates of ethylene oxide with propylene oxide condensates of propylene glycol ("Pluronics"), and amphoteric agents such as quaternized imidazole derivatives which are available under the trademark MIRANOL such as Miranol C2M.

Cationic surface active germicides and antibacterial compounds such as di-isobutylhexoxyethoxyethyl dimethyl benzyl ammonium chloride, benzyl dimethyl stearyl ammonium chloride, tertiary amines having one fatty alkyl group (of from 12 to 18 carbon atoms) and two poly(oxyethylene) groups attached to the nitrogen (typically containing a total of from 2 to 50 ethenoxy groups per molecule) and salts thereof with acids, and compounds of the structure

where R is a fatty alkyl group containing from 12 to 18 carbon atoms, and x, y and z total 3 or higher, as well as salts thereof with mineral or organic acids, may also be used.

It is preferred to use from 0.05% to 5% by weight of surface active material in the oral preparations according to the present invention.

In certain forms of this invention a fluorine-providing compound is present in the oral preparation. These compounds may be slightly soluble in water or may be fully water-soluble. They are characterized by their ability to release fluoride ions in water and by substantial freedom from reaction with other compounds of the oral preparation. Among these materials are inorganic fluoride salts, such as suitable alkali metal, alkaline earth metal, and heavy metal salts, for example, sodium fluoride, potassium fluoride, ammonium fluoride, lead fluoride, a copper fluoride such as cuprous fluoride, zinc fluoride, a tin fluoride such as stannic fluoride, or stannous chloro fluoride, barium fluoride, sodium fluorosiilicate, ammonium flourosilicate, sodium fluorozirconate, sodium monofluorophosphate, aluminum mono- and difluorophosphate, and fluorinated sodium calcium pyrophosphate. Alkali metal and tin fluorides, such as sodium and stannous fluorides and mixtures thereof, are preferred.

The amount of the fluorine-providing compound is dependent to some extent upon the type of compound, its solubility, and the type of oral preparation, but it must be a nontoxic amount. In a solid oral preparation, such as a toothpaste or toothpowder, it is considered that an amount of such compound which releases a maximum of 1% by weight, based on the weight of the preparation, is satisfactory. Any suitable minimum amount of such compound may be used, but it is preferable to employ sufficient compound to release from 0.005% to 1%, most preferably about 0.1%, by weight of fluoride ion. Typically, in the cases of alkali metal fluoride and stannous fluoride, this component is present in an amount up to 2% by weight, based on the weight of the preparation, and preferably in the range of from 0.05% to 1%. In the case of sodium monofluorophosphate the compound may be present in an amount up to 7.6% by weight, more typically 0.76%.

In a liquid oral preparation such as a mouthwash, the fluorine-providing compound is typically present in an amount sufficient to release up to 0.13%, preferably from 0.0013% to 0.1%, and most preferably from 0.0013% to 0.05% by weight of fluoride ion.

In certain forms of this invention an additional antibacterial agent in addition to the bis-biguanido hexane may be present in amount to provide a total of about 5% by weight of antibacterial agent. Such additional antibacterial agents include:

$N^1$-(4-chlorobenzyl)-$N^5$-(2,4-dichlorobenzyl)biguanide
p-chlorophenyl biguanide
4-chlorobenzhydryl biguanide
4-chlorobenzhydrylguanylurea
N-3-lauroxypropyl-$N^5$-p-chlorobenzylbiguanide
1-(lauryldimethylammonium)-8-(p-chlorobenzyl dimethylammonium)octane dichloride
5,6-dichloro-2-guanidobenzimidazole
$N^1$-p-chlorophenyl-$N^5$-laurylbiguanide
5-amino-1,3-bis(2-ethylhexyl)-5-methylhexahydropyrimidine and their nontoxic acid addition salts, particularly those where the anion includes a fluorine atom, such as fluoride, monofluorophosphate, hexafluorosilicate, and hexafluoroaluminate. The dihydrogen fluoride is preferred.

The total amount of antibacterial agents in the oral preparation will generally be in the range of 0.01% to 5% by weight, and a major amount (i.e., more than 50% by weight) of the antibacterial agent is desirably a bis-biguanido hexane, and the additional antibacterial agent is present in a minor amount.

Various other materials may be incorporated in the oral preparations of this invention. Examples are coloring or whitening agents, preservatives, silicones, chlorophyll compounds, and ammoniated material such as urea, diammonium phosphate, and mixtures thereof. These adjuvants, where present, are incorporated in the preparations in amounts which do not substantially adversely affect the properties and characteristics desired.

Any suitable flavoring or sweetening materials may also be employed. Examples of suitable flavoring constituents are flavoring oils, e.g., oils of spearmint, peppermint, wintergreen, sassafras, clove, sage, eucalyptus, marjoram, cinnamon, lemon, and orange, and methylsalicylate. Suitable sweetening agents include sucrose, lactose, maltose, sorbitol, sodium cyclamate, perillartine, and saccharin. Suitably, flavor and sweetening agent may together comprise from 0.01% to 5% or more of the preparation.

In the manufacture of dentifrices, it is conventional to remove entrained air from the product by deaeration under vacuum, typically at a late stage in the manufacture. In an aspect of the instant invention, it has been observed that in clear dentifrice gels of suitable viscosity, the dispersed immobile air bubbles desirably enhance the appearance of the dentifrice, and can, therefore, be permitted to remain. Alternatively, the air can be replaced with another gas in nontoxic quantity, such as nitrogen or carbon dioxide. In particular, carbon dioxide can provide an effervescent character to the dentifrice.

In the event that it is desired to have a minimum amount of air in the dentifrice of the instant invention, the "Unimix" apparatus described in *Process Engineering*, Sept. 11, 1970, pages 81–85, is particularly efficacious for this purpose. In this apparatus a mixing tool can be rotated in a clockwise or counterclockwise manner, and the action of the mixing tool is followed by the action of a scraper blade to ensure that the working surface of the apparatus is scraped clean. Preferably a plastic such as polytetrafluoroethylene is used as the scraper since it is compatible with the various ingredients of the dentifrice. The positioning of the mixing tool and the scraper from a raised central column in the apparatus and the further presence of a hydraulically operated vacuum tight lid permits but little air to enter the formulation during processing. Thus, gelling agent and a portion of liquid including water and/or humectant can be efficiently blended in the Unimix apparatus. Then the remaining water and liquid can be separately blended with the polishing agent and additional components (except for post-added components, such as flavoring oil) in the Unimix, and the two dispersions then blended together in the Unimix apparatus. If desired, the small amount of air present can be largely removed under the depressurized conditions in the apparatus. The apparatus can be used to blend ingredients at room temperature as well as at higher temperatures.

EXAMPLE I

A dentifrice was prepared from the following ingredients:

| | Percent by weight |
|---|---|
| Glycerine | 19.000 |
| Sodium carboxymethylcellulose | 1.000 |
| Sodium saccharin | 0.200 |
| Distilled water | 12.175 |
| Melilotin | 1.000 |
| Ethanol (95%) | 5.000 |

-Continued

| | Percent by weight |
|---|---|
| *Miranol HS concentrate | 2.000 |
| Chlorhexidine digluconate | 4.725 |
| Hydrated alumina | 54.000 |
| Flavor | 0.900 |

*Imidazoline-derived amphoteric sulfonated surface active agent wherein the fatty acid radical is a pure lauric acid derivative The glycerine, sodium carboxymethylcellulose, saccharin, and all but 60 ml. of water were mixed together for ten minutes. The melilotin was dissolved in ethanol and added to the glycerine premix; the resulting mixture was mixed for 10 minutes. The Miranol HS was added and mixing continued for 15 minutes. The chlorohexidine digluconate and remaining water was added and mixed for 20 minutes, after which the hydrated alumina and flavor were added.

The dentifrice so formulated retains sufficient in vivo activity to retard plaque formation without promoting staining of the teeth.

Dentifrice formulations containing melilotin in combination with the digluconate salt of chlorhexidine have been found cosmetically acceptable through an accelerated aging period of 9 weeks at 120°F., which is equivalent to a satisfactory shelf life.

EXAMPLE II

A dentifrice was prepared from the following ingredients according to the procedure of Example I, but substituting gallic acid for the melilotin.

| | Parts by weight |
|---|---|
| Glycerine | 22.000 |
| Sodium carboxymethylcellulose | 1.000 |
| Sodium saccharin | 0.200 |
| Distilled water | 14.675 |
| Gallic acid | 0.500 |
| Miranol HS | 2.000 |
| Chlorhexidine digluconate | 4.725 |
| Hydrated alumina | 54.000 |
| Flavor | 0.900 |

EXAMPLE III

A dentifrice was prepared from the following ingredients according to the procedure of Example II, substituting propyl aseptoform for the melilotin and adding the Ammonyx LO with the nonionic surfactant.

| | Percent by weight |
|---|---|
| Glycerine | 19.000 |
| Sodium carboxymethylcellulose | 1.000 |
| Sodium saccharin | 0.200 |
| Distilled water | 12.305 |
| Melilotin | 1.000 |
| Ethanol (95%) | 5.000 |
| Nonionic surfactant | 1.200 |
| *Ammonyx LO (30%) | 2.670 |
| Chlorhexidine digluconate | 4.725 |
| Hydrated alumina | 52.000 |
| Flavor | 0.900 |

*Nonionic lauryl dimethylamine oxide

EXAMPLE IV

A dentifrice was prepared from the following ingredients according to the procedure of Example II, but substituting propyl gallate for the melilotin.

| | Percent by weight |
|---|---|
| Glycerine | 22.000 |
| Sodium carboxymethylcellulose | 1.000 |
| Sodium saccharin | 0.200 |
| Deionized water | 14.075 |
| Propyl gallate | 0.100 |
| Ethanol (95%) | 1.000 |
| Miranol HS | 2.000 |
| Chlorhexidine digluconate | 4.725 |
| Hydrated alumina | 54.000 |
| Flavor | 0.900 |

EXAMPLE V

A mouthrinse concentrate is prepared by mixing together the following ingredients:

| | Percent by weight |
|---|---|
| Glycerine | 97.691 |
| Melilotin | 1.500 |
| Chlorhexidine diacetate powder | 0.093 |
| Sodium bicarbonate | 0.716 |

Ten grams of water are added to 5 grams of the above concentrate to yield a typical 15 gram dose.

EXAMPLE VI

A mouthrinse is prepared by mixing together the following ingredients:

| | Percent by weight |
|---|---|
| Ethanol with flavoring | 15.000 |
| Tween 80 | 2.000 |
| Glycerine | 10.000 |
| Gallic acid | 0.500 |
| Chlorhexidine digluconate (20% w/v) | 0.236 |
| Distilled water | 70.814 |
| Sodium saccharin | 0.020 |
| Sodium hydroxide (1.25 molar) | 1.430 |

The final pH of the mouthrinse was adjusted to between 5.5 and 6.0 with the sodium hydroxide.

EXAMPLE VII

Ethanolic solutions containing 0.50% chlorhexidine free base in combination with 1% of gallic acid or 1% of propyl gallate were tested for chemical activity after accelerated aging at 120°F. The results are tabulated below.

| Reducing Agent | % Activity Recovered after Aging at 120°F. | | | |
|---|---|---|---|---|
| | Initial | 3 weeks | 6 weeks | 9 weeks |
| Gallic acid | 108 | 90 | 94 | 84 |
| Propyl gallate | 110 | 90 | 90 | 80 |

Aqueous solutions containing 0.50% chlorhexidine free base in combination with 1% gallic acid or 0.1% propyl gallate were tested for chemical activity after accelerated aging at 120°F. The results are tabulated below.

| Reducing Agent | % Activity Recovered after Aging at 120°F. | | | |
|---|---|---|---|---|
| | Initial | 3 weeks | 6 weeks | 9 weeks |
| Gallic acid | — | — | — | 86 |
| Propyl gallate | 103 | 107 | 100 | 94 |

In addition, aqueous solutions of chlorhexidine digluconate with propyl gallate were used to test antimicrobial activity. The chlorhexidine digluconate was used at 4.725% by weight (0.5% free base) in 95% ethanol, and 0.1% propyl gallate was added. The results of three tests are as follows:

| | % Activity Recovered | | |
|---|---|---|---|
| | Initial | Three Weeks at 120°F. | Six Weeks at 120°F. |
| Test 1 | 92 | 99 | 115 |
| Test 2 | 103 | 107 | 100 |
| Test 3 | 88 | 100 | 115 |

Formulations containing propyl gallate, melilotin, and methyl aseptoform have been found cosmetically acceptable after accelerated aging for 3 weeks at 120°F.

Further testing was conducted to determine % chlorhexidine chemical activity as a function of the antioxidant used. In all of the tests, 4.725% chlorhexidine digluconate in 95% ethanol was used with 1% of the antioxidant. The results are tabulated below:

| | % Chemical Activity Recovered | | | |
|---|---|---|---|---|
| Antioxidant | Initial | 3 weeks at 120°F. | 6 weeks at 120°F. | 9 weeks at 120°F. |
| Gallic acid | 108 | 90 | 94 | 84 |
| Propyl gallate | 110 | 90 | 90 | 80 |
| Melilotin | 102 | 70 | 76 | 70 |

What is claimed is:

1. An oral preparation comprising a non-toxic bis-biguanido hexane compound as antibacterial agent in amount of from about 0.01% to about 5% by weight based on the free base thereof, a vehicle for said agent compatible therewith and as a stabilizing agent from about 0.01% to about 5% by weight of hydrogenated coumarin reducing agent.

2. The oral preparation of claim 1 wherein the oral preparation contains an additional antibacterial agent which is present in minor amount with respect to this bis-biguanido hexane compound and the total amount of antibacterial agents is about 0.01% to about 5% by weight.

3. The oral preparation of claim 1 wherein this bis-biguanido hexane compound is selected from the group consisting of 1,6-di-(p-chlorophenyl biguanido)hexane; 1,6-bis(2-ethylhexyl biguanido)hexane, and water-soluble salts thereof.

4. The oral preparation of claim 3 wherein the antibacterial agent is a water-soluble salt of 1,6-di-(p-chlorophenyl biguanido)hexane.

5. The oral preparation of claim 1 wherein said vehicle contains about 20–99% by weight of a solid, water-insoluble polishing material and the oral preparation is a dentifrice.

6. The oral preparation of claim 5 wherein said polishing material includes sodium metaphosphate.

7. The oral preparation of claim 5 wherein said dental vehicle also contains 0.05–5% by weight of a surface active agent.

8. The oral preparation of claim 7 wherein the surface active agent is nonionic.

9. The oral preparation of claim 1 wherein said vehicle contains about 70–99.9% by weight of a mixture of water and alcohol in a ratio of about 1:1 to about 20:1 by weight and said oral preparation is a mouthwash.

10. The oral preparation of claim 9 wherein the vehicle also contains 0.05–5% by weight of a surface active agent.

11. The oral preparation of claim 10 wherein the surface active agent is nonionic.

12. An oral preparation comprising a nontoxic bis-biguanido hexane compound as antibacterial agent in amount of from about 0.01% to about 5% by weight based on the free base thereof, a vehicle for said agent compatible therewith and as a stabilizing agent from about 0.01% to about 5% by weight of a reducing agent selected from the group consisting of tri-hydroxylated benzoic acid and lower alkyl esters of tri-hydroxylated benzoic acid.

13. The oral preparation of claim 12 wherein the reducing agent is tri-hydroxylated benzoic acid.

14. The oral preparation of claim 12 wherein the reducing agent is the methyl ester of tri-hydroxylated benzoic acid.

15. The oral preparation of claim 12 wherein the reducing agent is the n-propyl ester of tri-hydroxylated benzoic acid.

16. The oral preparation of claim 12 wherein the oral preparation contains an additional antibacterial agent which is present in minor amount with respect to the bis-biguanido hexane compound and the total amount of antibacterial agents is about 0.01% to about 5% by weight.

17. The oral preparation of claim 12 wherein the bis-biguanido hexane compound is selected from the group consisting of 1,6-di-(p-chlorophenyl biguanido) hexane; 1,6-bis(2-ethylhexyl biguanido) hexane, and water-soluble salts thereof.

18. The oral preparation of claim 17 wherein the antibacterial agent is a water-soluble salt of 1,6-di-(p-chlorophenyl biguanido) hexane.

19. The oral preparation of claim 12 wherein the vehicle contains about 70–99.9% by weight of a mixture of water and alcohol in a ratio of about 1:1 to about 20:1 by weight and said oral preparation is a mouthwash.

20. The oral preparation of claim 19 wherein the vehicle also contains 0.05–5% by weight of a surface active agent.

21. The oral preparation of claim 12 wherein said vehicle contains about 20–99% by weight of a solid, water-insoluble polishing material and the oral preparation is a dentifrice.

22. The oral preparation of claim 21 wherein said polishing material includes sodium metaphosphate.

23. The oral preparation of claim 21 wherein said dental vehicle contains 0.05–5% by weight of a surface active agent.

24. The oral preparation of claim 23 wherein the surface active agent is nonionic.

* * * * *